(No Model.)

F. WHITE & F. J. MURPHY.
ANIMAL TRAP.

No. 436,643. Patented Sept. 16, 1890.

Witnesses,
Geo. H. Strong.
C. H. Krouse

Inventors,
Frank White
Frank J. Murphy
By Dewey & Co.
Att'ys

UNITED STATES PATENT OFFICE.

FRANK WHITE AND FRANK J. MURPHY, OF POMONA, CALIFORNIA, ASSIGNORS, BY MESNE ASSIGNMENTS, OF TWO-THIRDS TO SAID WHITE AND ONE-THIRD TO SAID MURPHY.

ANIMAL-TRAP.

SPECIFICATION forming part of Letters Patent No. 436,643, dated September 16, 1890.

Application filed June 2, 1890. Serial No. 354,043. (No model.)

*To all whom it may concern:*

Be it known that we, FRANK WHITE and FRANK J. MURPHY, citizens of the United States, residing at Pomona, Los Angeles county, State of California, have invented an Improvement in Animal-Traps; and we hereby declare the following to be a full, clear, and exact description of the same.

Our invention relates to that class of animal-traps especially designed for catching burrowing animals, such as gophers, moles, &c., and in which opposing spring-controlled jaws are held separated by a suitable trigger, which upon being tripped allows the jaws to close.

Our invention consists in the novel double-ended trap hereinafter fully described, and specifically pointed out in the claims.

The object of our invention is to provide a simple and effective trap of this class having jaws at both ends, by which it is adapted to catch the animal coming from either direction.

Figure 1:
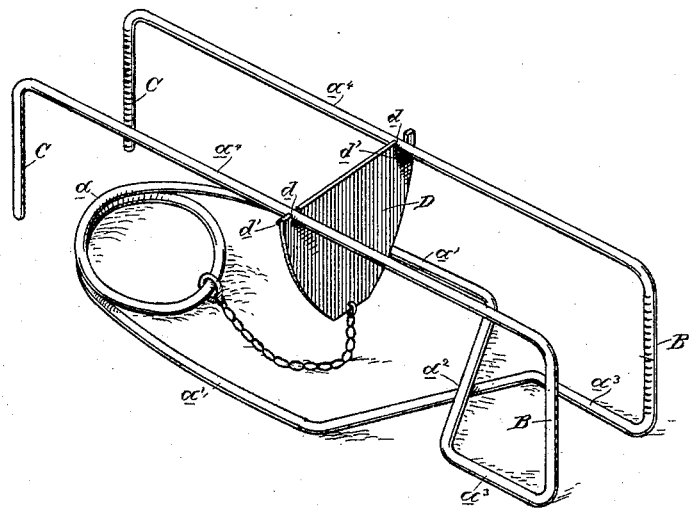
Figure 2:
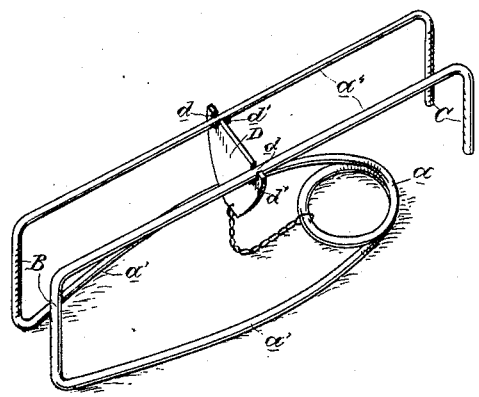

Referring to the accompanying drawings for a more complete explanation of our invention, Figure 1 is a perspective view of our trap, showing it set and ready for operation. Fig. 2 is a view of a trap, the sides of which do not cross.

The trap is made of a single piece of suitable wire bent at its middle to form the controlling-spring $a$, and thence extending with parallel sides $a'$, crossing each other at $a^2$, and thence parallel again at $a^3$, thence upwardly, forming the jaws B, and thence backwardly and parallel with each other, forming the jaw shanks or stems $a^4$, and thence downwardly at their ends, forming the other jaws C. Now it will be seen that by placing a suitable trigger of any form between the shanks or stems $a^4$ of the jaws they will be held apart and the jaws B and C held separated. When relieved of the trigger, the jaws at both ends spring together.

We may have any suitable form of trigger to hold the jaws separated. These triggers usually consist of plates of metal adapted in one form or other to engage the trap-sides and hold the jaws open. We have herein shown, as one form of trigger adapted for this purpose, the plate D, having notches $d$ at each side and provided with oppositely-extending flanges $d'$, this form being the one upon which we have heretofore applied for Letters Patent, Serial No. 352,406, filed May 19, 1890. We do not confine ourselves, however, to this trigger, as we can use other forms adapted to hold the jaws separated.

The trigger herein described is placed from below between the jaw stems or shanks $a^4$, so that its notches fit over them, while its flanges extend in opposite directions under them. The trap is placed in the animal's burrow and the trigger is in his path. The trigger upon being disturbed and tilted in either direction will trip itself readily, thereby allowing the jaws to come together. The separated jaws, being at both ends of the trap, provide for catching the animal approaching in either direction, and the spring-shanks themselves serve to insure his capture.

In this class of traps made from wire the sides sometimes cross each other so as to permit of a pressing force of the hand to open the jaws when setting the trap, and sometimes the sides are not crossed, so that a pulling force is required to separate the jaws. These forms are both common; and though we have shown in Fig. 1 the crossing form it will be evident, as we have shown in Fig. 2, that the sides need not cross, and still the essential feature of our invention, namely, the jaws at each end, may be present.

Having thus described our invention, what we claim as new, and desire to secure by Letters Patent, is—

1. An animal-trap consisting of a wire bent to form a controlling-spring, and thence carried forward and rearward to form opposing separable jaws at each end of the trap, substantially as herein described.

2. An animal-trap formed of a wire bent to make a controlling-spring, its sides thence extending forwardly and bent upwardly to form jaws at one end of the trap, and thence extending backwardly and bent downwardly to form jaws at the other end of the trap, substantially as herein described.

3. An animal-trap consisting of a piece of wire bent to form the controlling-spring, and its sides extending forwardly, crossing each other, and bent upwardly, forming the opposing jaws B at one end of the trap, and thence backwardly and bent downwardly at their ends, forming the jaws C at the other end of the trap, substantially as herein described.

4. An animal-trap consisting of a piece of wire bent to form the actuating-spring, the side of said wire being thence carried forwardly and crossing, and thence upwardly, forming the opposing jaws B at one end, and thence carried backwardly and downwardly, forming the opposing jaws C at the other end, and a suitable trigger-plate engaging the sides of the trap between the end jaws, whereby said jaws are held separated when the trap is set and allowed to spring together when the trigger is tripped, substantially as herein described.

In witness whereof we have hereunto set our hands.

FRANK WHITE.
FRANK J. MURPHY.

Witnesses:
SAML. McKEE,
IRA F. WHITE.